United States Patent [19]

Perego

[11] Patent Number: 5,152,473
[45] Date of Patent: Oct. 6, 1992

[54] CASSETTE DELIVERY SYSTEM

[75] Inventor: Luciano Perego, Milan, Italy

[73] Assignee: Tapematic USA, Inc., Orlando, Fla.

[21] Appl. No.: 543,227

[22] Filed: Jun. 25, 1990

[30] Foreign Application Priority Data

Jun. 28, 1989 [IT] Italy ................ 21022 A/89

[51] Int. Cl.[5] .............. B65H 18/10; B65H 19/30
[52] U.S. Cl. .................. 242/67.1 R; 242/56 R; 414/797.9
[58] Field of Search .......... 242/56 R, 67.1 R, 67.3 R, 242/58.4; 414/911, 797.9, 797.4, 797.5, 797.6, 797.7, 797.8, 798, 798.1

[56] References Cited

U.S. PATENT DOCUMENTS

| | | | |
|---|---|---|---|
| 3,814,343 | 6/1974 | Bennett et al. | 242/56 R |
| 3,997,123 | 12/1976 | King | 242/58.4 X |
| 4,332,355 | 6/1982 | Zopfy et al. | 242/56 R |
| 4,836,464 | 6/1989 | Perego | 242/56 R |
| 4,979,690 | 12/1990 | Kita | 242/56 R X |

Primary Examiner—John M. Jillions
Attorney, Agent, or Firm—Edgar H. Haug; Adam L. Brookman

[57] ABSTRACT

The present invention is an improved cassette delivery system. A plurality of cassettes to be loaded are maintained in a magazine. Cassettes are fed one at a time into an orientor which rotates them into the appropriate position for movement into the loading position. The empty cassette drops out of the orientor into an intermediate position where it rests upon the top edge of a pocket. The cassette is maintained at a slight angle so that it does not fall immediately into the pocket. The pocket moves outwardly to a point where its angle matches that of the cassette above it. The cassette then falls into the pocket and is carried backward into the loading position. Thereafter the cassette is loaded and discharged from the loading station.

15 Claims, 5 Drawing Sheets

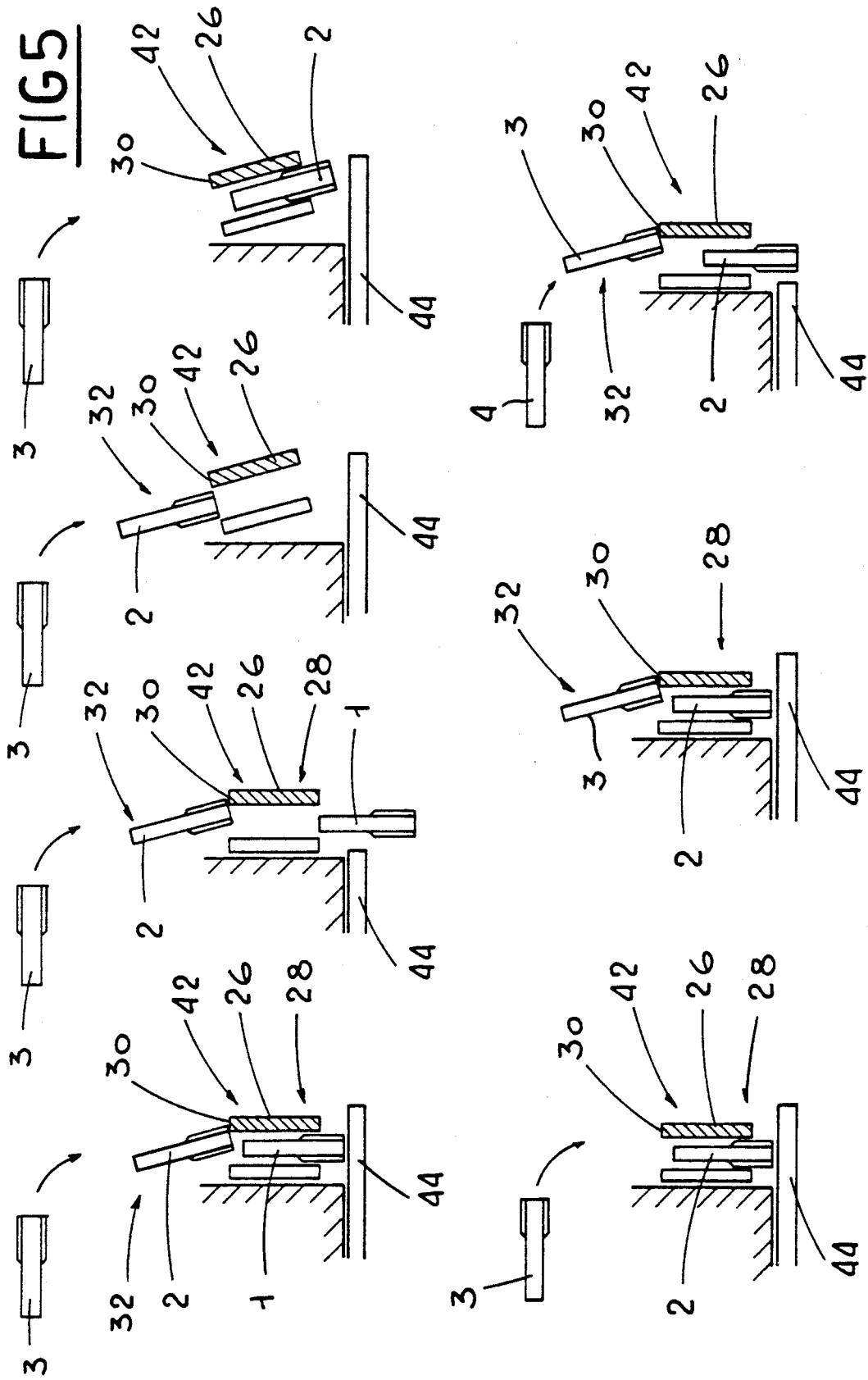

CASSETTE DELIVERY SYSTEM

A. FIELD OF THE INVENTION

This invention relates to equipment for loading tape into cassettes, and specifically to cassette delivery systems for cassette loading equipment.

B. BACKGROUND OF THE INVENTION

Equipment for automatically winding blank or pre-recorded magnetic tape into cassettes, such as audio or video cassettes, is known. Such devices are disclosed in U.S. Pat. Nos. 3,997,123, 3,814,343 and 4,836,464.

Typically, blank or pre-recorded magnetic tape is provided on one or two supply reels or "pancakes", which are mounted on hubs on the cassette loading machine. The blank or pre-recorded tape on a pancake is commonly referred to as "use tape".

A cassette, prior to loading, generally has two hubs located inside a plastic shell which are connected by a leader. An empty cassette (which has the two hubs connected only by a leader) is automatically delivered, from a magazine to a tape loading station of the cassette loading machine. At the loading station, a portion of the leader of the empty cassette is extracted and cut into two pieces by a cutter mechanism. Use tape from a pancake is spliced to one of the ends of the two cut leader pieces, and a pre-determined length of the use tape is wound, by a winding spindle, onto the appropriate cassette hub. For instance, enough blank use tape for 30, 60, 90 or 120 minutes of recording time may be wound onto the cassette hub. Alternatively, a portion of use tape containing a pre-recorded program (e.g. a record album) may be wound onto the cassette hub.

A control system synchronizes the motors that run the winding spindle and the supply reel hubs in order to maintain proper tension on the use tape during the winding operation. After the correct amount of use tape is wound onto the cassette hub, the use tape is cut and the cut section of the use tape is spliced to the remaining leader piece. The now loaded cassette is ejected or removed from the winding station and a subsequent empty cassette is inserted. The tape loading and winding operation is then repeated.

As indicated above, an empty cassette is delivered to a cassette winding station from a magazine. Two main types of magazines have been employed in the storage of empty cassettes to be loaded. The first is a curved or "elephant trunk" magazine which requires the operator to manually orient all the cassettes in the same direction. This creates a curved stack of cassettes which roughly conform to the magazine. A weight is then required to force the cassettes down to the bottom of the magazine. This type of magazine eliminates the need for rotation of the cassette from a horizontal to a vertical position since each cassette rotates through approximately 90° during its travel from the top to the bottom of the magazine.

A second type of magazine is a straight or vertical magazine. This type of magazine allows cassettes to be oriented in alternating directions (i.e. the way in which empty cassettes are typically packed) thus saving labor and simplifying the machine operator's task. Since cassettes are generally loaded while in a vertical position, this means that the cassette loading machine must rotate the cassette and orient the cassettes to a single common direction.

When the curved magazine is employed (as shown in U.S. Pat. No. 3,997,123) the first cassette located at the terminal end of the magazine is typically pushed, by a mechanical pusher mechanism, into a very short guide mechanism which guides the empty cassette into a cassette nest for loading. The cassette is held in the nest by a leaf spring mounted to the front panel of the machine behind the cassette. Each succeeding cassette which reaches the terminal end of the magazine rests on top of the cassette which is in the nest. When the cassette in the nest has been loaded, the cassette at the terminal end of the magazine is pushed with the pusher mechanism. Since this empty cassette is resting on top of the now full cassette in the nest, this action pushes the full cassette out of the nest and pushes the empty cassette into its place. (The force of the pusher mechanism overcomes the spring force of the leaf spring holding the cassette in the loading station.)

There are a number of drawbacks associated with this approach to cassette delivery. First, the operator must manually orient the cassettes prior to placing them in the magazine. Once the cassettes are placed in the magazine, a weight is needed to maintain the steady flow of cassettes toward the magazine's terminal end. This causes an operator still further delay in reloading the magazine. Additionally, the use of one cassette to push another cassette out of the loading station can mar the cassette shell and damage the cassette mechanism.

One approach to cassette delivery using a vertical magazine is shown in U.S. Pat. No. 3,814,343. In that approach the lowermost cassette is pushed sideways out of the vertical magazine into a receiver (which also functions as an orientor) which receives the cassette from the magazine and rotates it 90° from a horizontal to a vertical position. The receiver rotates the cassette forward or backward depending on the direction the open end is facing (ultimately, the open end must face down). The receiver is located at the loading station. Thus, when the cassette is pushed into the receiver, it is also being pushed into the loading station. When the cassette is full, the receiver rotates it 90° to a horizontal position. A second pusher mechanism located behind the front panel of the machine pushes the cassette into a discharge chute. The next cassette is then pushed into the receiver and the process is repeated.

This approach causes delays in the winding sequence because the cassette must be rotated immediately before it can be loaded. Still further delay occurs when the cassette must be rotated again prior to leaving the loading station. This approach does, however, avoid the manual orientation of cassettes prior to their placement in the magazine.

In another previously developed tape loading machine, empty cassettes are stored in a vertical magazine. The bottommost cassette from the magazine is pushed, with a pusher mechanism, into a rotating orientor. The rotating orientor maintains the cassette in a horizontal position, but rotates it 180°, if necessary, so that the open end of the cassette faces outwardly. A door, located beneath the rotating orientor, opens when the cassette is properly oriented. The door opens to an angle of approximately 45° at which point the empty cassette slides out of the rotating orientor and falls into a vertical guideway. The bottom front edge of the cassette contacts two spaced apart vertical guide members which comprise a portion of the vertical guideway. This contact serves to complete the rotation of the cassette from a horizontal position to a substantially vertical position.

When the bottom of the cassette is approximately 75% of the way down the guideway, it contacts a pin cylinder which retains it in an intermediate position above the loading station. (This intermediate position is used to sense which side of the cassette, if any, has the screws showing). When the loading station is empty, the pin cylinder is retracted and the empty cassette falls into the loading station. A platform at the bottom of the loading station stops the fall of cassette and maintains it in position for loading. When the cassette is full, the platform retracts and the cassette falls into a discharge mechanism.

Because of variations, cassettes have a tendency to rebound when they freefall from the intermediate position and hit the platform in the loading position. This delays the wind sequence because time must be allocated to allow the cassette to settle. Misalignment of the cassette can also occur because of this rebounding. This causes blocking and also delays the wind sequence.

C. SUMMARY OF THE INVENTION

The primary object of the present invention is to overcome the problems associated with previous cassette delivery systems. More specifically, an object of the present invention is to provide a cassette delivery system that increases the speed of the winding sequence.

Another object is to provide an apparatus which firmly holds a cassette in the loading station.

An additional object is to provide an apparatus which prevents the rebound of a cassette being introduced to the loading station.

The present invention provides an improved cassette delivery system. The upper portion of this delivery system is very similar to an earlier described prior delivery system. This includes a vertical magazine, a rotating orientor with a selectively movable door to release the cassette and a guideway.

The guideway associated with the present invention is substantially altered at its lower end so that it is very different from all prior guideways. The guideway of the present invention consists of two parallel guide pieces each having a channel into which the sides of the cassette fit. A front flap on the guide pieces acts to bring the cassette from 45° as it leaves the rotating orientor to an almost vertical position. A curved and angled protrusion at the lower end of each guideway forms a tighter channel with the front flap of the guide pieces so that the cassette is tilted slightly backward from the vertical position.

A pocket or receiver is located below the guideway. This pocket is capable of moving between two positions. The first position is for receiving a cassette and the second position is for loading a cassette. The front panel of the pocket has a top ledge upon which an empty cassette rests when it reaches the bottom of the guideway. The angle at which the cassette is maintained by the tight lower channel is set so that the cassette rests on this ledge without falling into the pocket itself.

When the loading station is empty, the pocket moves forward horizontally at a slight angle until the empty cassette resting on the top ledge of the pocket falls within its confines. The pocket then moves back, horizontally, carrying the cassette into the loading station. At all times, the cassette in the pocket is resting upon a retractable platform which juts out from the face of the machine.

The pocket holds the cassette on all four sides, thereby maintaining the cassette firmly in position in the loading station. Because of the manner in which the cassette falls into the pocket and the largely horizontal rather than strictly vertical movement of the cassette into the loading station, the rebound problem is eliminated and time is saved in the winding sequence.

D. DESCRIPTION OF THE DRAWINGS

FIG. 5 is a schematic representation of the cassette flow in the cassette delivery system of the present invention.

E. DETAILED DESCRIPTION

Figure 1:
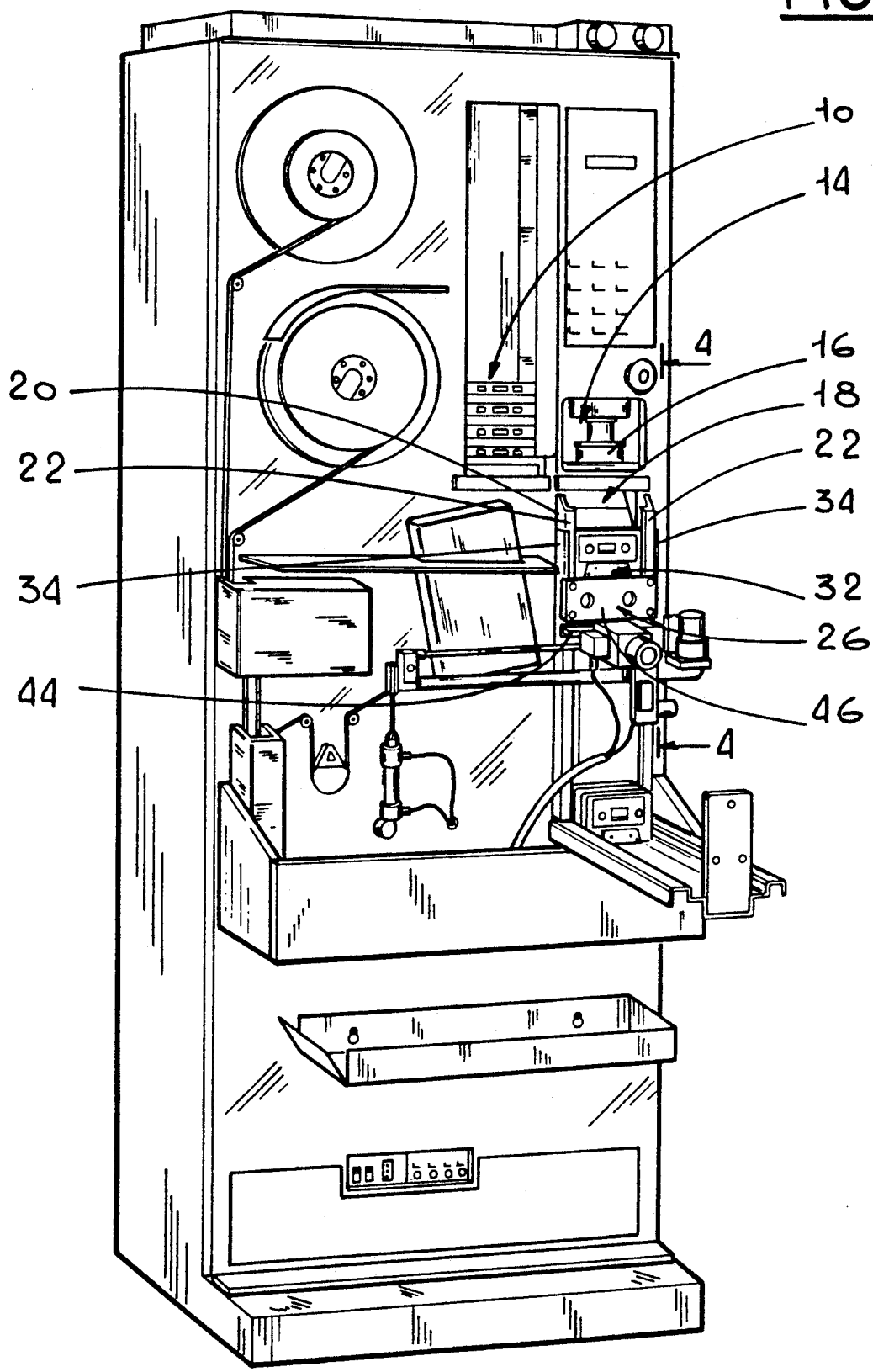
FIG. 1 is a front plan view of the cassette delivery system of the present invention.
Figure 2:
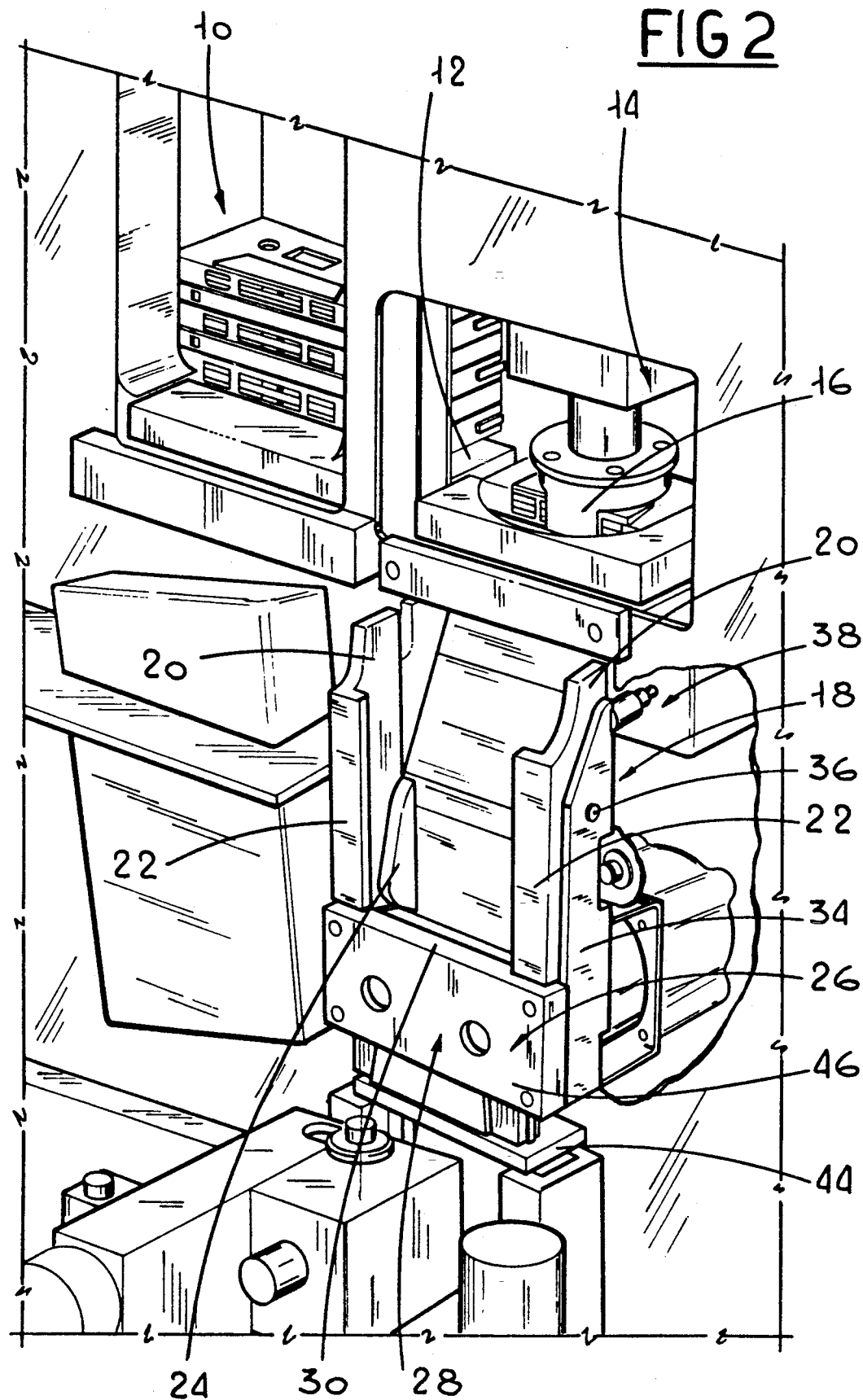
FIG. 2 is a front partial perspective view of the cassette delivery system of the present invention with a cassette in the loading station.
Figure 3:
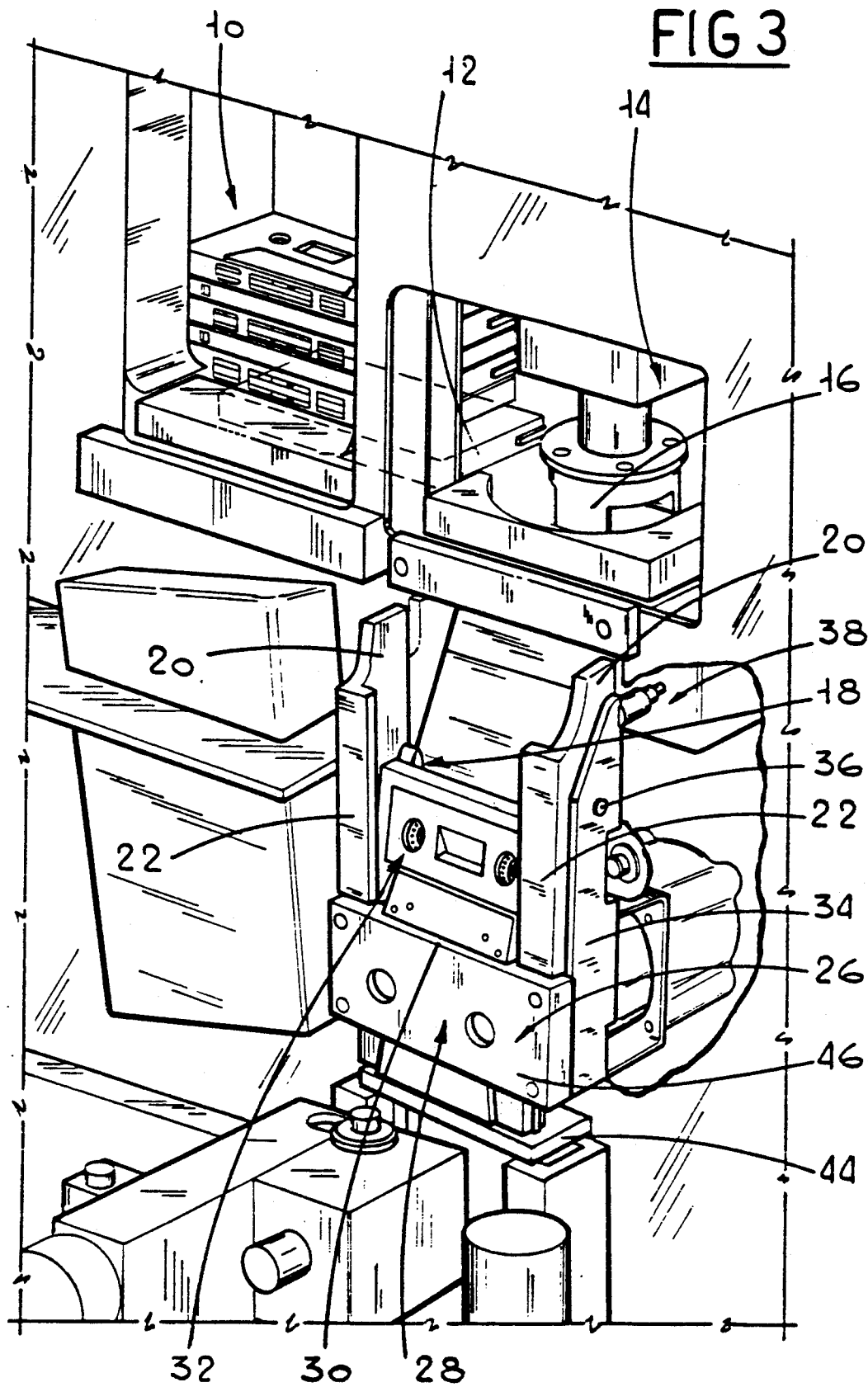
FIG. 3 is a front partial perspective view of the present invention with a cassette in the intermediate station and a cassette in the loading station.

As in prior audio tape loading machines, cassettes are initially stored in a vertical magazine 10 (see FIGS. 1-3). From the terminal end 12 of the magazine 10, the bottommost cassette is pushed, with a pusher mechanism (not shown), into a first station 14 having a rotating orientor 16. This device maintains the cassette in a horizontal position but rotates it 180°, if necessary, to turn the cassette so that the bottom or open end of the cassette faces outwardly. A "trap door" or tongue (not shown) located directly under the rotating orientor 16, drops down to an approximately 45° angle. The cassette then slides out of the first station 14 into a guideway 18.

The guideway 18 has a pair of spaced apart parallel guide pieces 20. Each guide piece 20 has a front flap 22 which interacts with the bottom of the cassette leaving the first station 14 via the tongue. This interaction causes the cassette to rotate further to an almost vertical position. Unlike other delivery systems, the front flap 22 along with the front of the machine's cabinet and a pair of protrusions 24 form a channel on either side of the guideway 18 for guiding the cassette towards the loading station 28 (see FIG. 2). The protrusions 24 are angled and curved and cooperate with the front flaps 22 to form a tight channel for the cassette at the bottom of the guideway 18.

A pocket or receiver 26 is located directly below the guideway 18 and serves to bring the empty cassette into the loading station 28. The pocket is comprised of two side walls/arms 34, a front plate 46 and a rear portion 48 (see FIGS. 2-4). The pocket 26 also has a top ledge 30, of front plate 46, upon which the empty cassette rests when it is at an intermediate (screw sensing) station 32. When the cassette is in this intermediate station 32, it is held at an angle less than 90° by the narrow channel created by the protrusions 24 and the front flap 22. It is important that this angle be maintained otherwise the cassette would fall immediately into the pocket 26.

Figure 4:
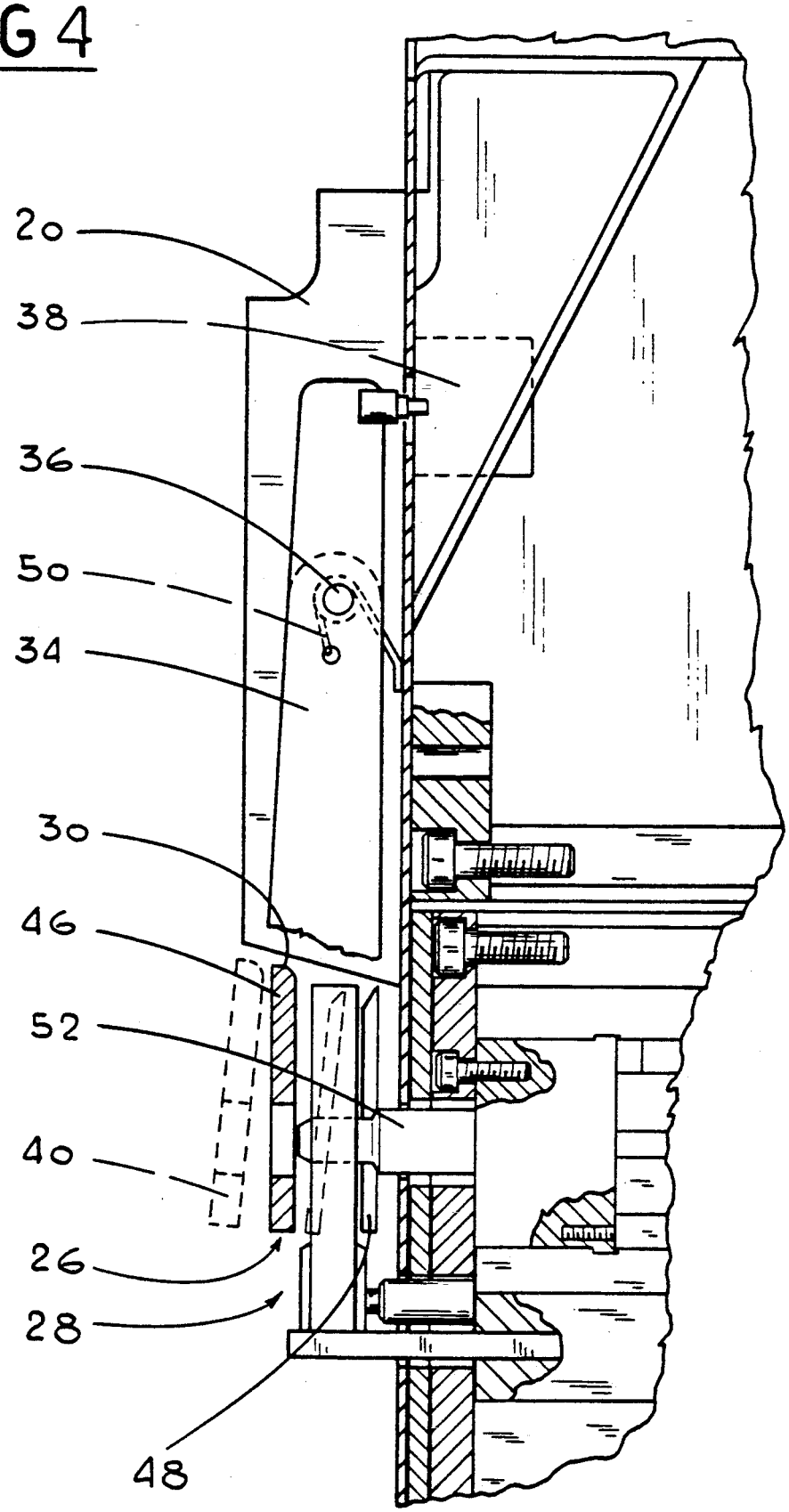
FIG. 4 is a partial cross sectional view of the cassette delivery system of the present invention taken along line 4—4 of FIG. 1.

Referring to FIGS. 4 and 5, the pocket 26 is movable through the pair of arms 34 which form the side walls of the pocket 26 and extend up along the guide pieces 20. Each arm 34 is attached to one of the guide pieces 20 at a pivot point 36. An air cylinder 38, located behind the machine's panel, moves the arms about the pivot points 36 so that the pocket 26 moves from a first receiving position 40 to a second loading position 42. The pocket 26 is biased toward the first receiving position 40 by a spring 50, but this bias is overcome by the force of the air cylinder 38 as the pocket 26 is moved toward the second loading position 42.

Referring to FIGS. 4 and 5, when the cassette loading station 28 is empty, the pocket 26 is moved outwardly away from the front cabinet of the machine by the air cylinder 38. While this movement is occurring the top of the cassette is held in place. As the pocket 26 nears its maximum outward position its angle matches the angles of the cassette resting on the ledge 30. When this occurs, the pocket 26 is considered to be in the receiving position 40 and the cassette is released and falls into the pocket 26. The cassette stays within pocket 26 because it contacts a retractable platform 44 with its bottom or leading edge. The air cylinder 38 then pulls the pocket 26 back in toward the machine's front face bringing the cassette into the loading station 28. A retractable winding spindle 46 is fitted into the center hole of one hub of the cassette and then winds a predetermined amount of use tape into the cassette. During this operation the cassette is maintained in position by the front plate 46, the rear portion 48 and the two side walls/arms 34 of the pocket 26.

Referring to FIG. 5, when the cassette is loaded, the platform 44 (shown in FIGS. 1 and 2) retracts and the full cassette falls into a cassette removal means. The next empty cassette, which is positioned on the ledge 30 is captured by the pocket 26 and pulled into the loading station 28. The next cassette located in the first station 14 is dropped down to the intermediate station 32 via the guideway 18 to rest on the ledge 30. The process continues in this manner until the supply of cassettes is exhausted.

Although the present invention has been described with reference to a specific embodiment, it should not be construed as limited to the details disclosed herein, as the disclosed embodiment is merely illustrative of the invention.

I claim:

1. A cassette delivery system for a tape loading machine comprising: magazine means for storing a plurality of cassettes to be loaded; first staging means for receiving a cassette from said magazine means; second staging means for receiving a cassette from said first staging means; guide means for guiding said cassette from said first staging means to said second staging means, wherein said guide means comprises first and second guide pieces each having a front flap portion and first and second angled channel guides forming an angled channel with said front flap portions of said first and second guide pieces; and pocket means for receiving a cassette from said second staging means and for transporting the cassette to a loading station.

2. A cassette delivery system for a tape loading machine comprising: magazine means for storing a plurality of cassettes to be loaded; first staging means for receiving a cassette from said magazine means; second staging means for receiving a cassette from said first staging means; and pocket means for receiving a cassette from said second staging means and for transporting the cassette to a loading station, wherein said pocket means comprises: a front portion; a rear portion; and first and second side wall means connecting said front and rear portions.

3. A delivery system according to claim 2, wherein said first side wall means comprises first movable arm means connected to a first guide piece at a first pivot point, and wherein said second side wall means comprises second movable arm means connected to a second guide piece at a second pivot point.

4. A delivery system according claim 3, wherein said pocket means is movable between a first cassette receiving position and a second cassette loading position.

5. A delivery system according to claim 4, wherein each of said first and second movable arms is pivoted about its respective pivot point when it is moved.

6. A delivery system according to claim 5, wherein said pocket means is moved between said first and second positions by said first and second movable arms.

7. A delivery system according to claim 6, wherein said first and second movable arm means are moved by a drive means.

8. A delivery system according to claim 7, wherein said drive means is an air cylinder.

9. A delivery system according to claim 8, wherein said pocket means is biased toward said first receiving position by a spring means.

10. A delivery system according to claim 2, wherein said front portion includes top ledge means for supporting a cassette in said second staging means.

11. A delivery system according to claim 10, wherein the location of any screws in a cassette are sensed when a cassette is in second staging means.

12. A cassette delivery system for a tape loading machine comprising: magazine means for storing a plurality of cassettes to be loaded; first staging means for receiving a cassette from said magazine means wherein said first staging means includes orientor means for orienting said cassette to an appropriate position for transfer to said second staging means and wherein a cassette is moved from said magazine means to said first staging means by pushing means; second staging means for receiving a cassette from said first staging means, wherein a cassette is released to said second staging means from said first staging means by door means located at the bottom of said first staging means; and pocket means for transporting the cassette to a loading station.

13. A delivery system according to claim 12, wherein said door means opens to an angle of approximately 45° from the horizontal.

14. A cassette delivery system for a tape loading machine comprising: magazine means for storing a plurality of cassettes to be loaded; first staging means for receiving a cassette from said magazine means; second staging means for receiving a cassette from said first staging means; and pocket means for receiving a cassette from said second staging means and for transporting the cassette to a loading station, wherein a cassette is supported in said pocket means by retractable platform means.

15. A delivery system according to claim 14, wherein a cassette is released from said pocket means by retraction of said retractable platform means.

* * * * *